(12) United States Patent
Stobbart

(10) Patent No.: US 11,910,045 B2
(45) Date of Patent: Feb. 20, 2024

(54) METHODS AND SYSTEMS FOR MANAGING CONTENT QUALITY IN A STORAGE MEDIUM

(71) Applicant: COMCAST CABLE COMMUNICATIONS, LLC, Philadelphia, PA (US)

(72) Inventor: Eric Stobbart, Snoqualmie, WA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 188 days.

(21) Appl. No.: 17/087,377

(22) Filed: Nov. 2, 2020

(65) Prior Publication Data
US 2021/0136435 A1   May 6, 2021

Related U.S. Application Data

(60) Provisional application No. 62/930,458, filed on Nov. 4, 2019.

(51) Int. Cl.
*H04N 21/2662* (2011.01)
*H04N 21/2343* (2011.01)
*H04N 21/24* (2011.01)

(52) U.S. Cl.
CPC ... *H04N 21/2662* (2013.01); *H04N 21/23439* (2013.01); *H04N 21/234363* (2013.01); *H04N 21/2402* (2013.01)

(58) Field of Classification Search
None
See application file for complete search history.

(56) References Cited

U.S. PATENT DOCUMENTS

| | | | | |
|---|---|---|---|---|
| 8,752,113 | B1 * | 6/2014 | Good | H04N 21/2662 725/116 |
| 2012/0005368 | A1 * | 1/2012 | Knittle | H04N 21/23805 709/235 |
| 2013/0058480 | A1 * | 3/2013 | Ziskind | H04N 21/4344 380/200 |
| 2014/0185466 | A1 * | 7/2014 | Syed | H04N 21/8456 370/252 |
| 2015/0213044 | A1 * | 7/2015 | Sparenberg | G06F 16/14 707/823 |
| 2017/0289221 | A1 * | 10/2017 | Khalid | H04L 65/602 |

* cited by examiner

*Primary Examiner* — James A Edwards
(74) *Attorney, Agent, or Firm* — BakerHostetler

(57) ABSTRACT

The quality of stored content may be managed prior to output. A computing device may request and receive content segments for output via the computing device. The content segments may comprise content encoded at a first bit rate selected by the computing device. The first content segments may be stored in a memory of the computing device, such as a buffer, until output at their respective presentation times. If network conditions improve, the computing device may improve the quality of at least one of the first content segments stored in the memory. The quality may be improved by requesting a higher bit rate version of the content segment and replacing, in the memory, the first content segment with the higher bit rate version of the content segment. The quality of the first content segment may be improved by adding data to the first content segment.

18 Claims, 8 Drawing Sheets

METHODS AND SYSTEMS FOR MANAGING CONTENT QUALITY IN A STORAGE MEDIUM

This application claims priority to U.S. Provisional Application No. 62/930,458, filed Nov. 4, 2019, entitled "Methods and Systems for Managing Content Quality in a Storage Medium," the content of which is hereby incorporated by reference in its entirety.

BACKGROUND

Adaptive streaming is a method of streaming content over a network, in which the source content is encoded at multiple, different bit rates. Content encoded at a lower bit rate typically has a lower quality (e.g., resolution) than content encoded at a higher bit rate. Each of the different bit rate versions of the content may be segmented into one or more segments, also sometimes referred to as fragments or chunks. The segment size may vary, but often the segments each have a presentation duration of between two and ten seconds. In some types of adaptive streaming, a user device receives a manifest file that describes the available segments of each version of the content and their respective encoded bit rates. A user device may request segments of a selected one of the bit rate versions. As segments of the selected bit rate version of content are received, they may be stored in a buffer until output by the user device. If the user device finds that the network throughput (e.g., bandwidth) is greater than the bit rate of a downloaded segment, the user device may request the next segment from a higher bit rate version of the content. Later, if the user device finds that the network throughput has deteriorated, it may request the next segment from a lower bit rate version.

SUMMARY

Methods, apparatus, and systems are described for managing the quality of stored content prior to the content being output. A computing device may request and receive content segments via a network for output via the computing device. The content segments may comprise content encoded at a first bit rate selected by the computing device. These first content segments may be stored in a memory of the computing device, such as a content buffer, until output at their respective presentation times. During output of the content segments stored in the buffer, the computing device may detect that a condition of the network has improved and may request additional content segments comprising content encoded at a second bit rate that is higher than the first bit rate. These additional content segments may be associated with a position on a content timeline ahead of a current output position associated with output of content segments from the buffer. If there is sufficient time between the current output position and the timeline position of the additional content segments received from the network, the computing device may improve the quality of one or more of the first content segments stored in the buffer that have not yet been output. Improving the quality of one of the first content segments may comprise requesting a higher bit rate version of the first content segment and replacing, in the buffer, the first content segment with the higher bit rate version. Improving the quality of one of the first content segments may comprise adding, to the first content segment, a difference in a quantity of bits between the first content segment and a quantity of bits corresponding a higher bit rate version of the content segment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to features that solve any or all disadvantages noted in any part of this disclosure.

BRIEF DESCRIPTION OF THE DRAWINGS

The following detailed description is better understood when read in conjunction with the appended drawings. For the purposes of description, examples are shown in the drawings; however, the subject matter is not limited to specific elements and instrumentalities disclosed. In the drawings.

DETAILED DESCRIPTION

Figure 1:
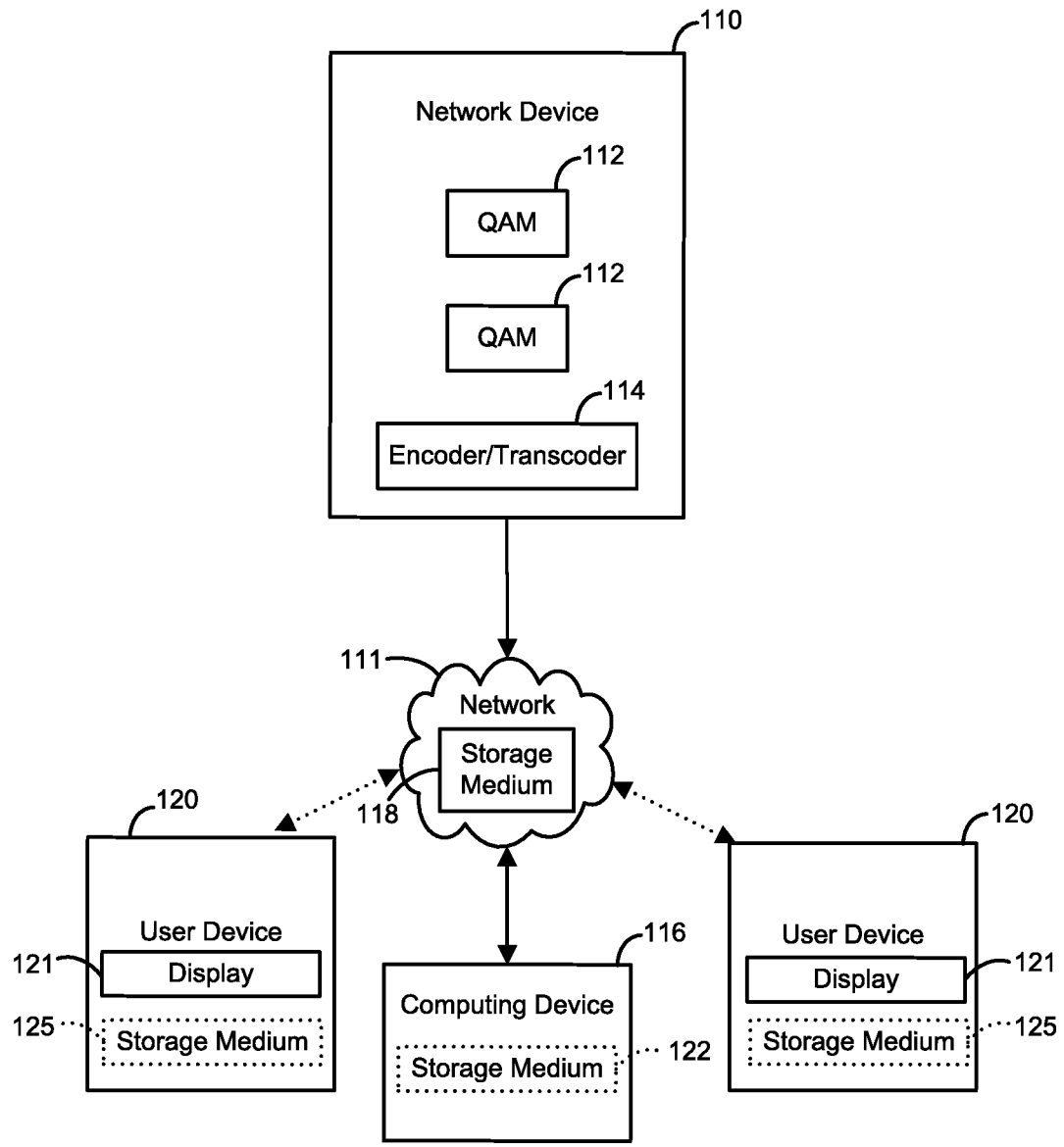
FIG. 1 shows an example system.

A content asset may comprise one or more of linear content, non-linear content, video content, audio content, multi-media content, recorded content, stored content, or any other form of content a user may wish to consume. A content asset may comprise one or more versions of the content, each of which may be referred to as a stream. Each version may comprise a different encoding of the content asset. Each version may have properties that differ from other versions, such as a different encoding bit rate, compression technique, compression ratio, resolution, frame rate, video quality (for video), number of channels, or sampling rate (for audio). Each version of a content asset may comprise one or more segments, sometimes also referred to as chunks or fragments, which may be independently accessible for playback on a user device.

Each content segment may correspond to some portion of the playback time, or presentation duration, of the content. For example, each segment may have a presentation duration of two seconds of the content. Each segment may have a presentation duration of another length, such as 4, 6, or 8 seconds. Because the segments of different versions of the content may be encoded at different bit rates, segments of different streams that correspond to a same playback time/duration typically have different sizes. For example, a two second segment encoded at a higher bit rate may comprise more data (e.g., bits or bytes) than the corresponding two second segment encoded at a lower bit rate.

A version, or stream, of a content asset may be described in a manifest, and a user device may use the manifest to request segments of a version for playback on the user device. For each segment of a version of the content asset, the manifest may comprise information identifying a network location, such as a uniform resource indicator (URI) or uniform resource locator (URL), from which the segment may be retrieved. A user device may send a request to the content provider to retrieve a segment of the content, identifying the segment by its associated URI or URL. For example, the user device may send a hypertext transfer protocol (HTTP) GET request to the content provider.

Adaptive streaming is a technique in which a user device monitors network conditions over time, such as available bandwidth, and switches among different quality versions of a content asset during playback depending on the determined network conditions. For example, if the network bandwidth available to the user device is high, the user device may request a higher quality version of the content for playback. However, if network conditions deteriorate, and the bandwidth available to the user device is reduced, the user device may switch to a lower quality version of the content in order to prevent issues during playback that would result in a poor user experience, such as freezing or stalling of the displayed content. Adaptive streaming techniques include, for example, adaptive bit rate (ABR) streaming, in which the different quality versions of the content are associated with different encoding bitrates. Example implementations of adaptive bit rate streaming techniques include MPEG DASH (Dynamic Adaptive Streaming over HTTP) and Apple HLS (HTTP Live Streaming).

Different versions of a content asset may be encoded at different bit rates. The encoding may be performed by a computing device, a portion of a computing device, and/or software executing on a computing device. The computing device may comprise an encoder. The different bit rate versions may be encoded and then stored, for example, as a group, for later retrieval and output (e.g., playback). Alternatively, or in addition, a given bit rate version of a content asset may be generated dynamically, for example upon request. Typically, a computing device, such as an encoder, offers a number of different encoding bit rates, such as, for example, three, five, or some other number of encoding bit rates. These different bit rates made available are typically referred to as a bit rate ladder. For example, a content asset may be encoded, or offered for encoding, at the following different bit rates—4000 kbps (highest quality/resolution), 2000 kbps, 1000 kbps, 500 kbps, and 300 kbps (lowest quality/resolution)—and these different bit rates may collectively be referred to as a bit rate ladder.

In adaptive streaming implementations, a user device may rely on bandwidth estimation in order to determine whether to switch to a different version of content having a lower or higher bit rate. A user device may periodically estimate the available bandwidth based on aggregated statistics associated with recently received content, such as the time required to download a recent segment of the content. If the estimated available bandwidth is sufficient to support receiving a higher bit rate version of the content, the user device may switch to the higher bit rate version from that point forward (e.g., the 4000 kbps bit rate at the top of the example bit rate ladder above). If the estimated available bandwidth is insufficient to support download of the current version of the content, the user device may choose to switch to a lower bit rate version to avoid interruptions in playback, such as stalls or freezing, that would result in a poor user experience. For example, the user device could move down the bit rate ladder in the example above from the 4000 kbps bit rate to the 2000 kbps bit rate. If problems still persist, the user device could choose to move further down the bit rate ladder, perhaps even to the lowest available bit rate (e.g., 300 kbps).

As segments of a particular bit rate version of content are received, they may be stored in a buffer until output by the user device. If network conditions improve, and the user device is able to switch to requesting segments of a higher bit rate version, the previously received lower bit rate segments may still remain in the buffer for output by the user device—even though network conditions have improved to allow higher bit rate (i.e., higher quality) segments to be received going forward. Output of the previously received lower bit rate content segments may negatively impact the user experience. Improvements are needed to address these and other drawbacks.

Quality of stored content may be managed prior to the content being output. A computing device may receive one or more first content segments from a network device, which comprise content encoded at a first bit rate. The first content segments may be stored in a memory of the computing device, such as a buffer, until output at their respective presentation times. During output of the one or more first content segments stored in the memory, the computing device may, based on detecting that network conditions have improved, request one or more second content segments from the network device, which comprise content encoded at a second bit rate that is higher than the first bit rate. Additionally, or alternatively, the request may be generated by the computing device in response to the computing device detecting an event(s) pertaining to a content segment (e.g., stopping the rendering of a content segment, etc.). The computing device may send the request to a network device. The one or more second content segments may be associated with a position on a content timeline ahead of a current output position associated with output of content segments stored in the memory. If there is sufficient time between the current output position and the timeline position of the one or more second content segments received from the network device, the computing device may improve the quality of one or more of the first content segments stored in the memory that have not yet been output. Improving the quality of one of the first content segments may comprise requesting from the network device a higher bit rate version of the first content segment and replacing the first content segment in the memory with the corresponding higher bit rate version of the content segment. Additionally or alternatively, improving the quality of the first content segment may comprise adding, to the first content segment, a difference in a quantity of bits between the first content segment and a corresponding higher bit rate content segment.

FIG. 1 shows various aspects of an exemplary network environment in which the present methods and systems may operate. Some aspects of the present disclosure relate to methods and systems for increasing quality of content segments. The methods and systems may be used in or employ both digital and analog equipment. The methods and systems disclosed herein may be performed by, or implemented in, software, hardware, or a combination of software and hardware.

The network environment may comprise a network device 110 (e.g., a server, a headend, processing facility or other computing device), which may receive content (e.g., data, input programming) from multiple sources. The network device 110 may combine the content from the various sources and may distribute the content to user devices 120 and/or communication device 116 via a distribution system and/or network, such as network 111.

The network device 110 may be a data processing facility configured to receive content from a variety of sources. The content may be transmitted from the source to the network device 110 via a variety of transmission paths, including wireless and terrestrial paths. The network device 110 may comprise one or a plurality of signal modulators such as quadrature amplitude modulation (QAM) devices 112 that may be associated with an input source. The QAM devices 112 may convert received content into a modulated output signal suitable for transmission over the network 111. MPEG encoders, such as an encoder 114, may be included for encoding/transcoding data such as content. A data packaging device, such as a fragmenter, may be integrated with the encoder 114 (or separate and in communication with the encoder 114) to package the encoded/transcoded content. The encoder 114 and/or fragmenter may repeatedly embed markers, flags, and signals into the content data stream for processing by downstream devices. The network device 110 may send content segments (e.g., live content, video on demand content, recorded content) to the user devices 120 and/or communication device 116. The user devices 120 and/or communication device 116 may store the received content segments to a memory (e.g., storage medium 122, storage medium 125) to cache the content segments for output (e.g., rendering). The network device 110 may select/implement a higher bit rate for content segments awaiting output based on a request received from the user device 120 and/or communication device 116 to upgrade the quality of corresponding low-quality content segments stored in a memory (e.g., storage medium 122, storage medium 125).

The network 111 may be configured to distribute signals from the network device 110 to one or more other devices (e.g., communication device 116 and/or one or more user devices 120). The network 111 may be an optical fiber network, a broadband network, a coaxial cable network, a hybrid fiber-coaxial network, a wireless network, a satellite system, a direct broadcast system, or any combination thereof. There may be a multitude of user locations connected to network 111. The network 111 may comprise a storage medium 118.

The storage medium 118 may be configured as network storage such as cloud storage accessible by one or more user devices 120 and/or the communication device 116. One or more content assets (e.g., video, audio, etc.) may be loaded into the storage medium 118 and stored for playback or processing by the one or more user devices 120 and/or the communication device 116. Other data, content, and/or information may also be stored in the storage medium 118. The storage medium 118 may be separate from the network 111. The storage medium 118 may be located upstream of one or more user devices 120 and/or the communication device 116 and downstream of the network 111. The storage medium 122 (e.g., static or removable) may store information to be transmitted to any number/quantity of the user devices 120 and/or the communication device 116, or other recipient devices.

The user devices 120 and/or the communication device 116 may process a data stream, which may comprise audio, video, or other data from the network 111 with a regular cadence (e.g., every two seconds, four seconds, ten seconds, and the like). Other data and tracks may be received and processed by the user devices 120 and/or the communication device 116. A user device 120 and/or communication device 116 may detect one or more improved network conditions in the network 111. The user device 120 and/or communication device 116 may send a request, based in part on detecting the improved network conditions, to the network device 110 for a higher-quality content segment corresponding to a low-quality content segment stored in a memory (e.g., storage medium 122, storage medium 125), awaiting to be output (e.g., rendered). The network device 110 may select/implement a higher bit rate for the higher-quality content segment, relative to a bit rate of the of the low-quality content segment and may send the high-quality content segment to the user device 120 and/or communication device 116. The user device 120 and or communication device 116 may upgrade the quality of the low-quality segment with the high-quality segment received from the network device 110.

The user devices 120 and/or the communication device 116 may be configured as a decoder, such as a gateway, set-top box, or communications terminal (CT) to decode, if needed, the signals for display on a display device, such as on a display 121. Those skilled in the art will appreciate that the signals may be decoded in a variety of equipment, including a CT, a computer, a TV, a monitor, a cable network, or a satellite dish. The methods and systems disclosed may be located within, or performed on, one or more CT's, displays 121, network devices 110, DVR's, home theater PC's, and the like. The communication device 116 and/or the user devices 120 may receive signals from the network 111 for rendering content. Rendering content may comprise providing/outputting audio and/or video, outputting (e.g., displaying) images and/or video, facilitating an audio and/or visual feedback, tactile feedback, and the like. Other content may also be rendered via communication device 116 and/or the user devices 120. The user devices 120 and/or the communication device 116 may also be an Internet Protocol compatible device for receiving signals via a network such as the Internet or some other communications network for providing content to a user. It is understood that other display devices and networks may be used.

The communication device 116 may be configured to include a removable storage medium (e.g., storage medium 122) and the user devices 120 may be configured to include a removable storage medium 125. The storage medium 122 and the storage medium 125 may comprise a flash memory or any other suitable memory. A number of content assets (e.g., video, images, audio, etc.) may be written to the storage medium 122 and/or the storage medium 125 and stored for playback or processing by the associated user device 120 and/or communication device 116. Other data, content, and/or information may also be stored in the storage medium 122 and/or the storage medium 125. The storage medium 122 and the storage medium 125 may be separate from the communication device 116 and user device 120 and in communication with the communication device 116 and user device 120 such as via a portable flash drive. The storage medium 122 may be used to provide a buffer for caching a portion (e.g., a playback duration) of a current transport stream received by the communication device 116 from the network 111. The storage medium 125 may also be used to provide a buffer for caching a portion (e.g., a playback duration) of a current transport stream received by a user device 120 from the network 111.

Figure 2:
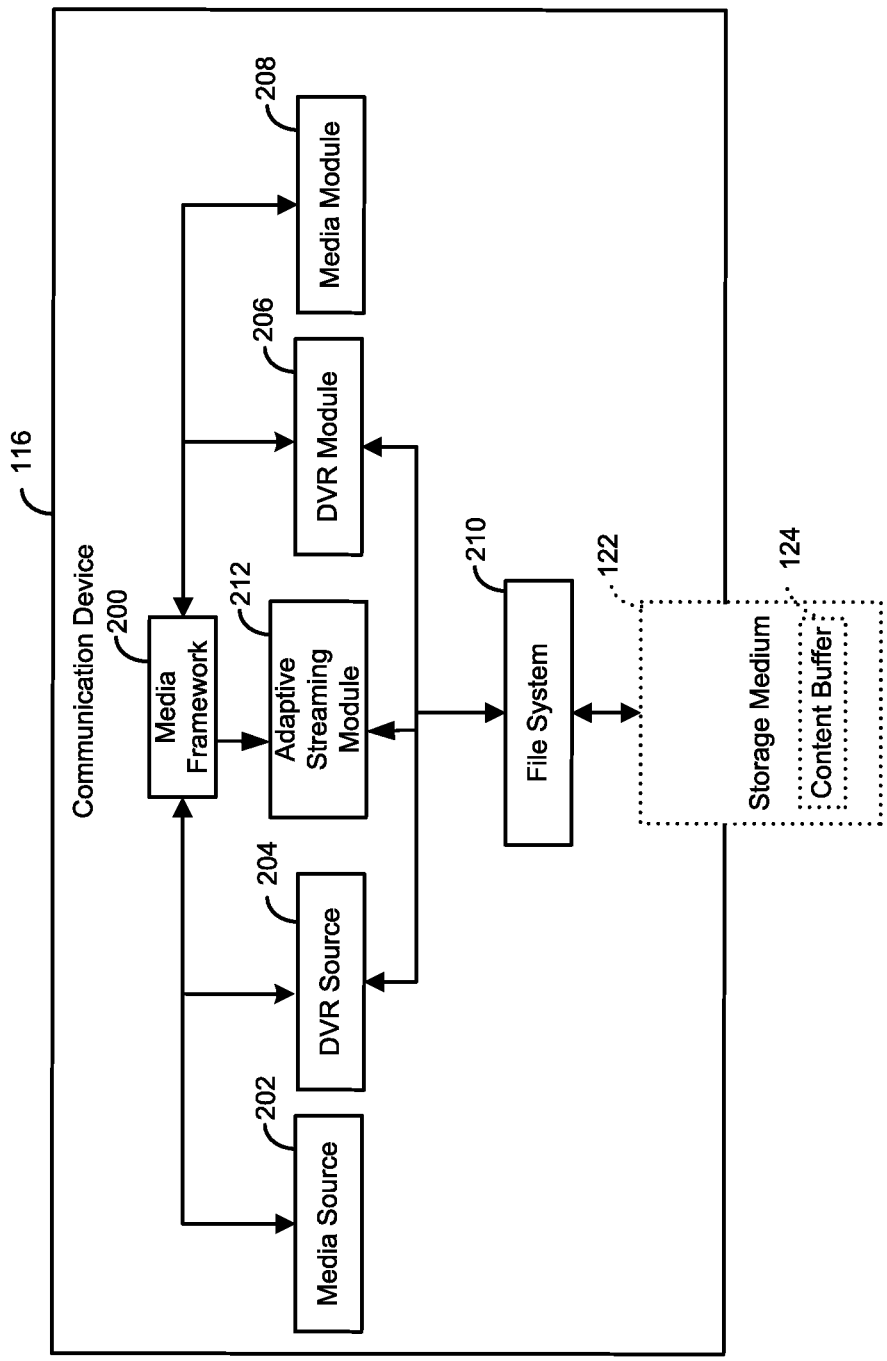
FIG. 2 shows an example communication device.

FIG. 2 shows an example of the communication device 116. The communication device 116 may comprise a media framework 200 for managing one or more media components (e.g., plug-ins) configured to control, for example, simple audio playback, audio and video playback, recording, streaming and editing. The media framework 200 may comprise hardware and/or software for managing the media components and service flows to/from the media components. The media components may comprise a media source 202, a DVR source 204, a DVR module (e.g., sink) 206, a media module (e.g., sink) 208, and an adaptive streaming module 212 or the like. The communication device 116 may receive one or more content segments (e.g., live content, video on demand content, recorded content) from the network device 110 and may store the content segments in storage medium 122 to cache the content segments for output (e.g., rendering). The communication device 116 may detect one or more improved network conditions in the network 111. The communication device 116 may generate and send a request, based on detecting the improved network conditions, to the network device 110 for a high-quality content segment. The requested high-quality content segment corresponds to a low-quality content segment stored in the storage medium 122 awaiting to be output (e.g., rendered). The communication device 116 may upgrade the quality of the low-quality content segment with the high-quality content segment in the storage medium 122 based on receipt of the high-quality content segment from the network device 110.

The media source 202 (e.g., home network source) may be or comprise software for receiving data, processing data, and outputting a content stream (e.g., single program transport stream (SPTS)). The media source 202 may be configured to decrypt content, for example, using digital transmission content protection (DTCP).

The DVR source 204 may be or comprise software for receiving data, processing data, and outputting a content stream (e.g., single program transport stream). The DVR source 204 may be configured to manage the playback of stored content (e.g., stored in storage medium 122). The DVR source 204 may also be configured to read content from the storage and playback the read content stream (e.g., MPEG SPTS).

The DVR module 206 may be or comprise software for managing the storing and indexing of data such as at least a portion of a content stream. The DVR module 206 may comprise a DVR sink. The DVR module 206 may also be configured to store the indexed data corresponding to the content stream in a memory (e.g., storage medium 122). The DVR module 206 may also be configured to store data as a persistent recording for subsequent retrieval and playback.

The media module 208 may be or comprise software for managing the playback of content segments such as a live content stream, video on demand content stream, and/or recorded content stream. The media module 208 may comprise a media sink. The media module 208 may cache one or more content segments of the live content stream, video on demand content stream or recorded content stream to a content buffer 124 of the storage medium 122 for output (e.g., rendering). The content segments have an associated quality (e.g., a low-quality content segment, a high-quality content segment). The media module 208 may also be configured to start, stop, pause, fast forward, rewind, etc. playback of content.

The communication device 116 may comprise a file system 210, such as a flash file system for interfacing with the storage medium 122. The file system 210 may be configured to manage the storage and retrieval of data to/from the storage medium 122. The file system 210 may comprise drivers to facilitate the management of various types and configurations of the storage medium 122. The file system 210 may manage the storage/retrieval of data to/from the storage medium 122 to cache one or more content segments (e.g., a playback duration) of a current transport stream to the content buffer 124.

The adaptive streaming module 212 may comprise hardware and/or software for detecting one or more network changes and based on detecting one or more improved network conditions, the adaptive streaming module 212 may generate a request (e.g., a network request) for a higher-quality content segment corresponding to a low-quality content segment stored in the content buffer 124. The adaptive streaming module 212 may send the request for the higher-quality content segment to the network device 110. The request may be for a higher-quality content segment at a play position ahead of where a display is currently outputting (e.g., rendering) a content segment of a content stream. In response to receiving the higher-quality content segment, the adaptive streaming module 212 may store and upgrade the corresponding lower-quality content segment in the content buffer 126 with the higher-quality content segment received from the network device 110 prior to outputting (e.g., rendering) the lower-quality content segment, as described more fully below. Based on the media module 208 outputting the content stream and reaching the output position of the higher-quality content segment, the media module 208 may cause a display to output (e.g., render) the higher-quality content segment instead of outputting (e.g., rendering) the lower-quality content segment.

Figure 3:
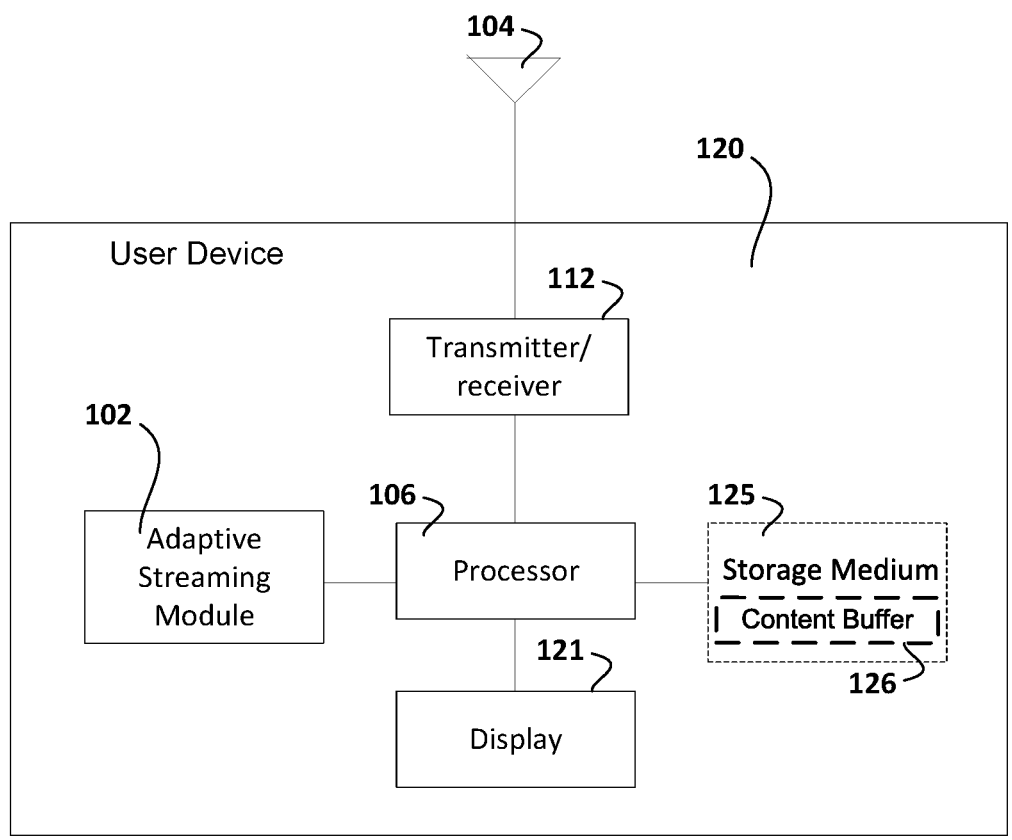
FIG. 3 shows an example user device.

FIG. 3 shows an example of a user device (for example, the user device 120). The user device 120 may be a communications terminal (e.g., a mobile device, a streaming-video player, a smart phone, a smart tablet or any other suitable computing device). The user device 120 comprises an antenna 104 that is adapted to receive and transmit signals in cooperation with a transmitter/receiver unit 112. The antenna 104 and the transmitter/receiver unit 112 may also receive media content stream (e.g., live content stream, video on demand content stream, and/or recorded content stream) from a network device (e.g., network device 110). The user device 120 may receive one or more content segments (e.g., live content, video on demand content, recorded content) from the network device 110 and may store the content segments in storage medium 125 to cache the content segments for output (e.g., rendering). The user device 120 may detect one or more improved network conditions in the network 111. The user device 116 may generate and send a request, based on detecting the improved network conditions, to the network device 110 for a high-quality content segment. The requested high-quality content segment corresponds to a low-quality content segment stored in the storage medium 125 awaiting to be output (e.g., rendered). The user device 120 may upgrade the quality of the low-quality content segment with the high-quality content segment in the storage medium 125 based on receipt of the high-quality content segment from the network device 110.

The processor 106 is also connected to a storage medium 125. The storage medium 125 may comprise volatile and/or non-volatile memory, and may store instructions, applications, algorithms or the like for execution by the processor 106. The storage medium 125 may be a non-transitory computer-readable medium storing instructions that may be executed by the processor 106 to cause the user device 120 to perform steps described herein. The storage medium 125 may also store content segments (e.g., content stream) or other data, information or the like. The content stream received (e.g., live content stream, video on demand content stream, and/or recorded content stream) from a network device (e.g., network device 110) may be stored in the storage medium 125.

The user device 120 may manage the playback of stored content (e.g., stored in storage medium 125). The user device 120 may be configured to read content from the storage and playback the read content stream (e.g., MPEG SPTS).

The user device 120 may cache one or more content segments of the content stream to a content buffer 126 of the storage medium 125. The user device 120 may cache one or more content segments of the content stream to a content buffer 126 of the storage medium 125 while rendering the content stream to the display 121. The content segments stored in the content buffer 126 have an associated quality (e.g., a low-quality content segment, a high-quality content segment).

The processor 106 may be in communication with and may otherwise control an adaptive streaming module 102. The adaptive streaming module 102 may be any device or circuitry operating in accordance with software or otherwise embodied in hardware or a combination of hardware and software thereby configuring the device or circuitry (e.g., a processor, controller, microprocessor or the like) to perform the corresponding functions of the adaptive streaming module 102, as described below. In examples in which software is employed, a device or circuitry (e.g., processor 106 in one example) executing the software forms the associated structure. The adaptive streaming module 102 may be configured to, among other things, detect one or more network changes and based on detecting one or more improved network conditions, the adaptive streaming module 102 may generate a request (e.g., a network request) for a high-quality content segment corresponding to a low-quality content segment stored in the content buffer 126. The adaptive streaming module 102 may send the request for the high-quality content segment to the network device 110. The request may be for a high-quality content segment at a play position ahead of where the display 121 is currently outputting (e.g., rendering) a content segment of a content stream.

The adaptive streaming module 102 may store and upgrade (i.e., improve) the corresponding low-quality content segment in the content buffer 126 with the high-quality content segment received from the network device 110 prior to outputting (e.g., rendering) the low-quality content segment, based on receiving the high-quality content segment from the network device 110. Based on the user device 120 outputting the content stream and reaching the output position of the higher-quality content segment, the user device 120 may cause the display 121 to render the higher-quality content segment instead of outputting (e.g., rendering) the lower-quality content segment.

A computing device (e.g., user device 120, communication device 116) associated with a user may render a segment of a content stream and the user either pauses the content or otherwise allows content to accumulate in a buffer (e.g., content buffer 124, content buffer 126). At some point along a content timeline ahead of where the computing device is currently rendering (e.g., outputting/displaying video content and/or outputting audio) content, the computing device may detect that network conditions have improved. Based on detecting that network conditions have improved, the computing device may request a higher-quality stream from a network device (e.g., network device 110). Based on and/or after receiving the request, the network device may obtain (e.g., download) a higher-quality stream having a higher bit rate (e.g., and higher resolution) and may send the higher-quality stream to the computing device. The computing device may store the higher-quality stream to the buffer (e.g., content buffer 124, content buffer 126) to upgrade a corresponding lower-quality stream stored in the buffer. In this manner exemplary systems may utilize adaptive bit rate to take advantage of the improved network conditions by also increasing the quality of the segments that have already been stored to a buffer at a point ahead of where the computing device is currently rendering a content segment such that the computing device may provide better quality content for viewing by a user.

Figure 4:
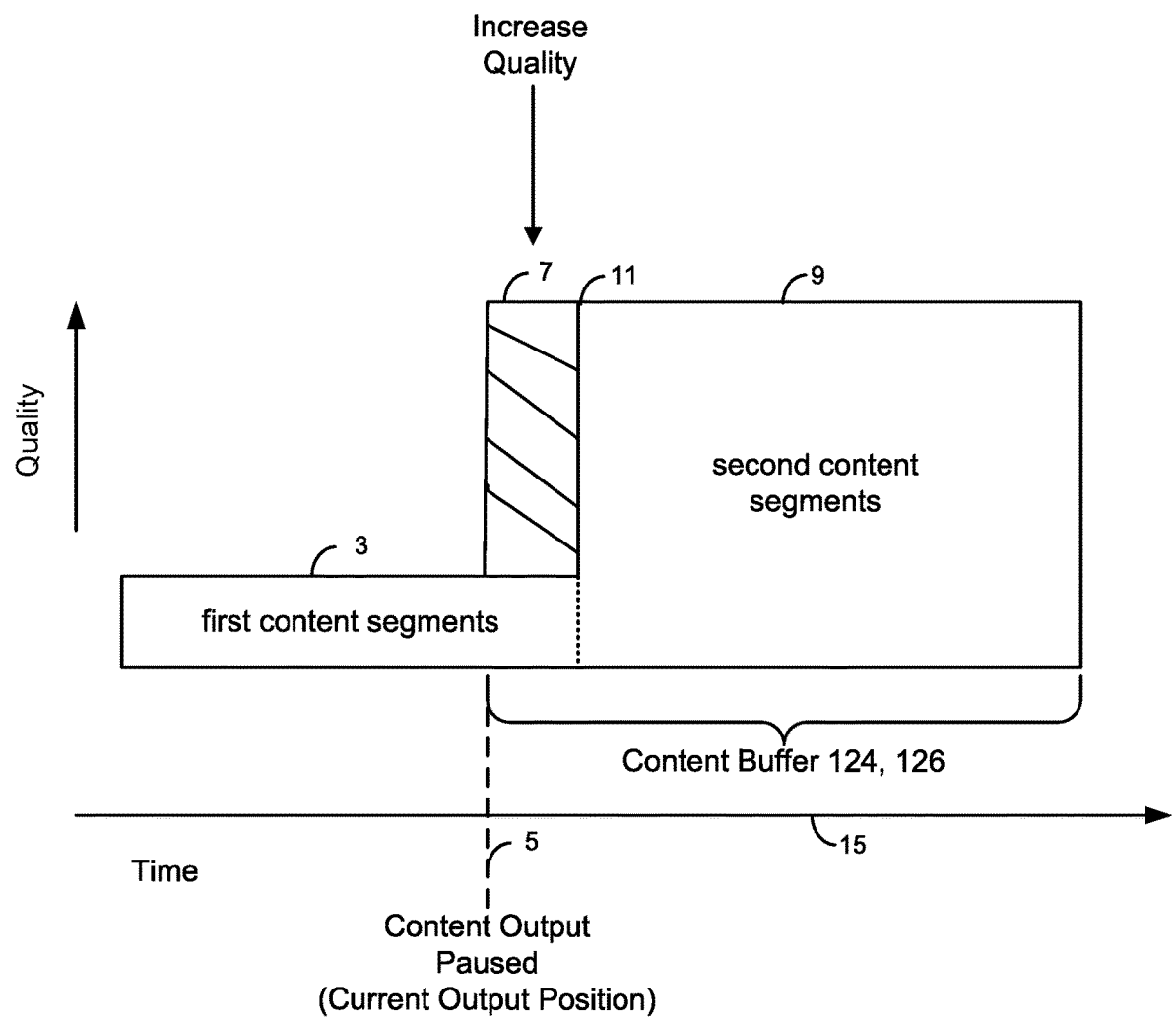
FIG. 4 shows an example of content segments in a storage medium.

FIG. 4 shows an example of content segments downloaded and stored in a content buffer. A computing device (e.g., user device 120, communication device 116) may receive the content segments from a network device (e.g., network device 110) via a network (e.g., network 111). The first content segments 3 may comprise low-quality content. The first content segments 3 may comprise content encoded at a first bit rate. The first bit rate may be a lower bit rate than other bit rates at which the content is available. During output (e.g., rendering, playback, etc.) of the first content segments 3, the computing device may pause output of the first content segments 3 at the pause point 5. The pause point 5 may represent a current output position of the computing device. The first content segments 3 to the left of the current output position 5 in the example of FIG. 4 may comprise first content segments that have already been output. After pausing output of the first content segments 3 at the pause point 5, a number of first content segments 3 yet to be output may still reside in the buffer corresponding to presentation time period 7 (e.g., to the right of the current output position/pause point 5 up to presentation time 11). As further shown, at a time associated with presentation time 11, the computing device may determine that network conditions have improved.

From the time associated with presentation time 11 forward, the computing device may request one or more second content segments 9 having a higher-quality than the first content segments. The second content segments may comprise content encoded at a higher bit rate (e.g., 8 Mbps) and/or a higher resolution (e.g., 3840×2160) relative to the lower bit rate (e.g., 4 Mbps) and/or a lower resolution (e.g., 1920×1080) associated with the first content segments. As shown, the presentation time 11 associated with the beginning of the higher quality content segments 9 may be ahead of the current output position (e.g., pause point 5) by an amount of time 7. The first content segments 3 that remain in the buffer and are associated with the time period 7 may be candidates for improved quality in accordance with the methods described herein. For example, if the presentation time 11 associated with the beginning of the second content segments 9 in the buffer is sufficiently ahead of the current output position 5 (e.g., the difference between the presentation time 11 and the current output position 5 exceeds a threshold), there may be sufficient time to increase the quality of one or more of the first content segments 3 remaining in the content buffer. The threshold may comprise an amount of time, such as 250 msec. The threshold may comprise more or less time. The threshold may represent an amount of time sufficient to enable the computing device to request and receive a higher quality version of a content segment and to replace one of the first content segments 3 remaining in the buffer with the corresponding higher quality version of the content segment. The threshold may represent an amount of time sufficient to enable the computing device to request and receive more data (e.g., bits) and to add that additional data to one of the first content segments 3 remaining in the buffer, thereby improving its quality.

The computing device may choose to improve the quality of one or more of the first content segments remaining in the content buffer, starting with a first content segment closest to the presentation time 11 (e.g., furthest in time from the current output position 5) and working backwards in time toward the current output position 5. For example, assume the presentation duration of each segment comprises 2 seconds, and the computing device pauses output after five of the first content segments (e.g., lower quality content segments) have been output (i.e., at the 10 second mark). Assume further in this example that the computing device executed an adaptive bit rate increase at the 16 second mark.

That is, at the 16 second mark, the computing device began requesting and receiving second content segments having a higher quality. In accordance with the methods described herein, the computing device may first improve the quality of the first content segment 3 remaining in the buffer that corresponds to the two second time period from 14 to 16 seconds. Next, the computing device may improve the quality of the first content segment corresponding to the two second time period from 12 to 14 seconds, and so on. Improvement may continue until the computing device reaches the 10 second mark, which is the current output position. Additionally or alternatively, the computing device may request higher quality versions of more than one of the first content segments 3 at a time.

The computing device may resume output from the 10 second mark (e.g., the user un-pauses the output), and at that point the computing device will begin outputting the improved quality content segments. Thus, the user experience is improved and output of the lower-quality first content segments that had remained in the buffer is avoided; the improved quality content segments are output instead. Even if there is only sufficient time to improve the quality of some of the first content segments remaining in the buffer, the method disclosed herein at least shortens the time in which the computing device renders lower-quality content from the content buffer.

If the time period 7 is less than the threshold amount of time needed to improve the quality of one or more of the first content segments remaining in the buffer, the computing device may output the first content segments in the buffer when output continues (e.g., resumes) from the pause point 5 toward presentation time 11.

As mentioned above, improving the quality of one of the first content segments may comprise requesting a higher bit rate content segment corresponding to the first content segment (i.e., a higher bit rate version of the first content segment) and replacing the first content segment with the corresponding higher bit rate version of the content segment in the memory. Alternatively, or in addition, improving one of the first content segments may comprise adding, to the first content segment, a difference in a quantity of data (e.g., bits) between the first content segment and a corresponding higher bit rate content segment. That is, an additive encoding technique may be used which leaves the lower base quality first content segment in the content buffer and downloads a difference in data (e.g., bits) between a high-quality content segment and the low-quality first content segment. In such an additive encoding technique, the difference in data (e.g., quantity of bits) is added to the base quality of the first content segment to increase the quality to match the quality of a higher-quality content segment. An advantage to the additive encoding technique is that less data may be requested and received than in the case of requesting a completely new higher bit rate content segment to replace the lower bit rate first content segment.

A network device (e.g., network device 110) may upshift a bit rate for upgrading the quality of a low-quality content segment more than once (e.g., twice or more) to obtain a better quality content segment. Bit rates may correspond to rungs (e.g., levels of bit rates) on a bit rate ladder. A network device may increase the bit rate of a content segment one rung at a time.

An adaptive streaming module (e.g., adaptive streaming module 212) may send to the computing device a first higher-quality content segment associated with a higher bit rate (e.g., and having a corresponding higher resolution) relative to a bit rate of the lower-quality content segment. The computing device may replace or update the lower-quality content segment in the content buffer with this first high-quality content segment. Based on the adaptive streaming module 212 determining that a content segment associated with the first high-quality content segment may be obtained at an even higher bit rate (e.g., and corresponding higher resolution), the network device may send a second higher-quality content segment to the computing device to increase or upgrade the quality of the first higher-quality content segment stored in the content buffer prior to rendering the first higher-quality content segment. In this manner a content segment associated with the timespan of the corresponding low-quality content segment may be updated more than once (e.g., twice) in the content buffer.

Figure 5:
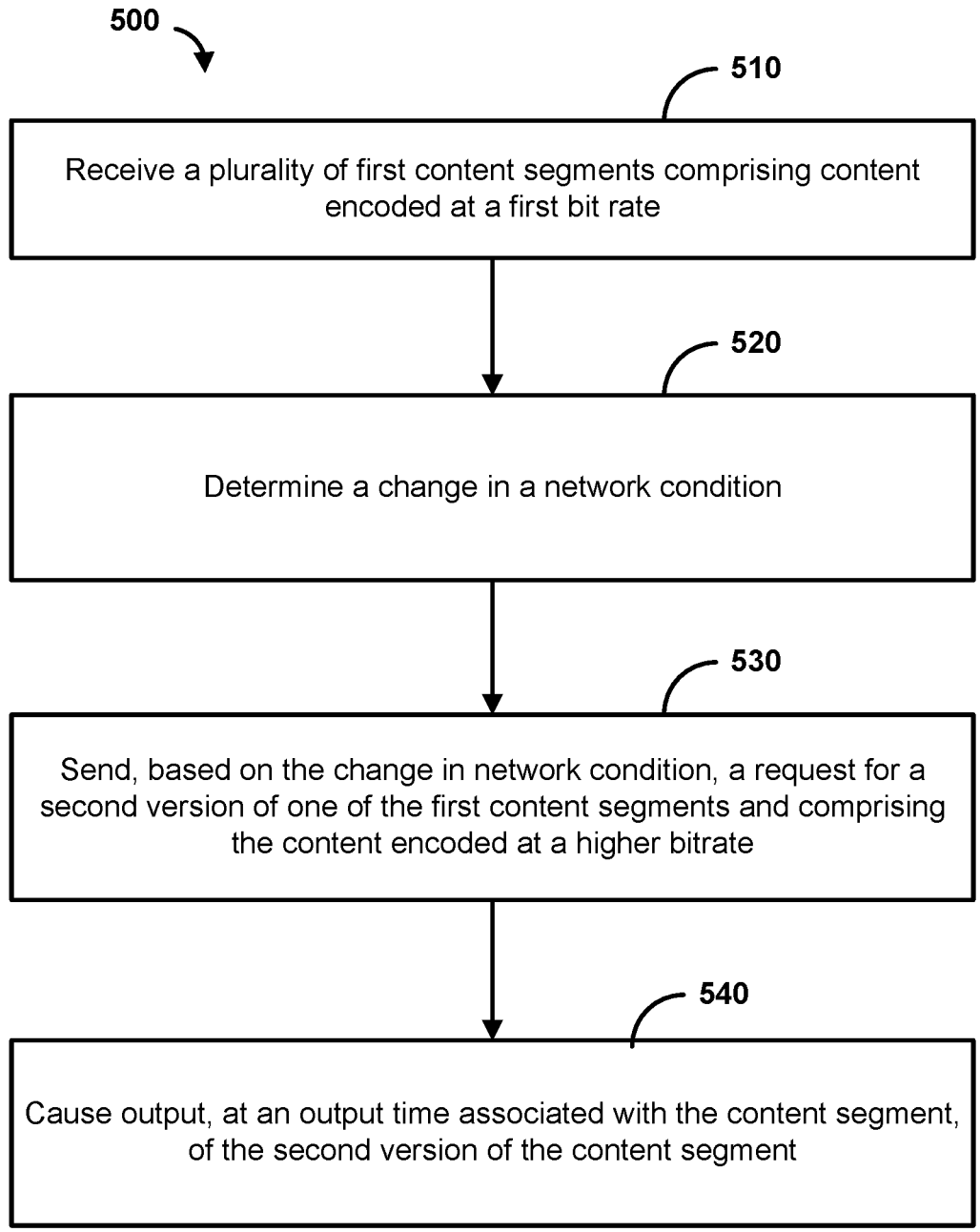
FIG. 5 shows an example method.

FIG. 5 is a flow diagram showing an example method 500 for managing the quality of one or more content segments. In step 510, a plurality of first content segments (e.g., the first content segments 3) may be received by a computing device (e.g., user device 120, communication device 116). The plurality of first content segments may comprise at least one of linear content, non-linear content, video content, audio content, multi-media content, recorded content, or stored content. The plurality of first content segments may be associated with a first quality. The first quality may be associated with an encoding bit rate or a resolution of the content of the content segments. The plurality of first content segments may be stored in a memory, such as a storage medium (e.g., storage medium 122, storage medium 125), of the computing device. The memory may comprise a content buffer (e.g., content buffer 124, 126).

In step 520, a change (e.g., improvement) in a condition of a network (e.g., network 111) may be determined. The determined change may comprise a detected increase in available bandwidth. The change may comprise a detected increase in throughput. The change may comprise a detected increase in data transfer speed. The change may comprise a detected increase in another metric associated with the network. The computing device may detect or determine the change in the condition. The change in the condition may be reported to the computing device by another device associated with the network.

In step 530, based on the determined change in the network condition, the computing device may send, to a network device (e.g., network device 110), a request for a second version of one of the first content segments. The requested second version of the content segment may have a presentation time and duration that corresponds to the presentation time and duration of the first content segment. The second version of the content segment may be associated with a higher quality than the first content segment. The second content segment may comprise content encoded at a higher bit rate than the content of the first content segment.

The sending of the request may be further based on determining that a difference between a current output time associated with output of content segments and the output time associated with the first content segment satisfies a threshold. The current output time may be ahead of the output time associated with the first content segment in relation to a timeline associated with the content. The threshold may comprise an amount of time. For example, the threshold may comprise 250 msec. The threshold may comprise another amount of time. The threshold may represent an amount of time sufficient to enable the computing device to request and receive the second version of the content segment prior to the output time (e.g., presentation time) associated with the first content segment.

In step 540, a quality of the one of the first content segments may be improved. The quality of the first content segment may be improved by replacing, in the memory, the first content segment with the received second, higher quality version of the content segment. Additionally or alternatively, the quality of the first content segment may be improved by adding to the first content segment a quantity of data (e.g., bits) representing a difference between the amount of data of the first content segment and the amount of data of the second, higher quality version of the content segment. The quality of the first content segment may be improved by an additive encoding process.

For example, a user may be watching content (e.g., live content, video on demand content, recorded content) via a computing device (e.g., user device 120 (e.g., a mobile device), or communication device 116 (e.g., a set-top box)). While outputting (e.g., rendering) content segments of the content for viewing by the user, the computing device may generate a request for a high-quality content segment to upgrade a low-quality content segment ahead of where the computing device is currently outputting (e.g., rendering) the content segment the user is watching. The request may be generated by the computing device in response to the computing device detecting one or more improved network conditions, such as improved bandwidth, throughput, or data rate. The detection of at least one improved network condition may be based on determining that a time to generate and send the request to a network device is below a predetermined threshold time. Additionally or alternatively, the request may be generated by the computing device in response to the computing device detecting one or more status events (e.g., a change in status of a content segment (e.g., stopping output of the content segment)). The computing device may send the request to the network device for the higher-quality content segment. The network device may send the higher-quality content segment to the computing device. The higher-quality content segment may comprise content encoded at a higher bit rate relative to a lower bit rate of the low-quality content segment. Based on and/or after receiving the higher-quality content segment, the computing device may upgrade the low-quality content segment with the higher-quality content segment in the memory prior to outputting (e.g., rendering) the low-quality content segment. The computing device may upgrade the low-quality content segment by replacing/swapping the low-quality content segment with the high-quality content segment in the memory. The computing device may also upgrade the low-quality content segment by adding a difference in bits between the low-quality content segment and the high-quality content segment to the low-quality content segment in the memory.

Figure 6:
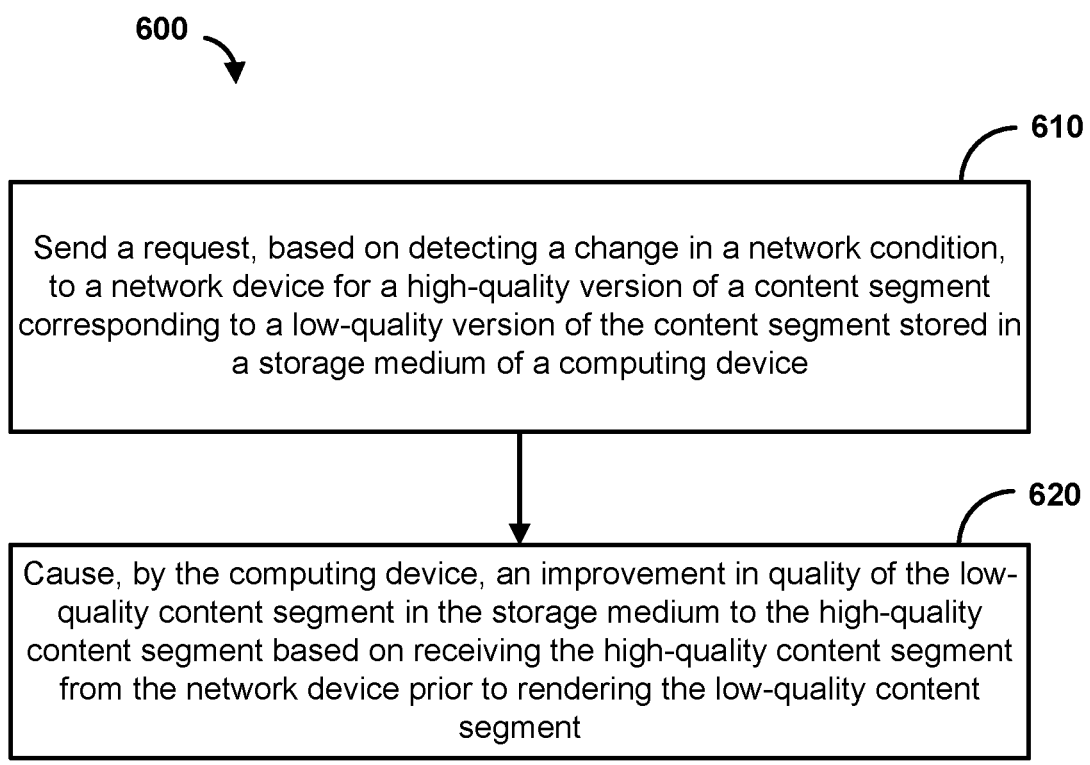
FIG. 6 shows an example method.

FIG. 6 is a flow diagram showing an example method 600 for managing the quality of content segments. At step 610, a request may be generated to send to a network device (e.g., network device 110) for a high-quality version of a content segment corresponding to a low-quality version of the content segment (e.g., one of the low-quality content segments 3) stored in a storage medium (e.g., storage medium 122, storage medium 125) of a computing device (e.g., user device 120, communication device 116). The request may be generated based on detecting at least one improved network condition. Additionally or alternatively, the request may be generated by the computing device in response to the computing device detecting one or more status events (e.g., a change in status of a content segment (e.g., stopping output of the content segment)).

At step 620, upgrading of the low-quality content segment in the storage medium may be caused. The low-quality content segment may be upgraded to the high-quality content segment based on receiving the high-quality content segment from the network device prior to outputting (e.g., rendering) the low-quality content segment. The high-quality content segment may comprise the same content encoded at a higher bit rate than a bit rate associated with the low-quality content segment.

Upgrading of the low-quality content segment may comprise replacing/swapping the low-quality content segment with the high-quality content segment in the storage medium. Additionally or alternatively, upgrading of the low-quality content segment may also comprise adding a difference in bits between the low-quality content segment and the high-quality content segment to the low-quality content segment stored in the storage medium.

Figure 7:
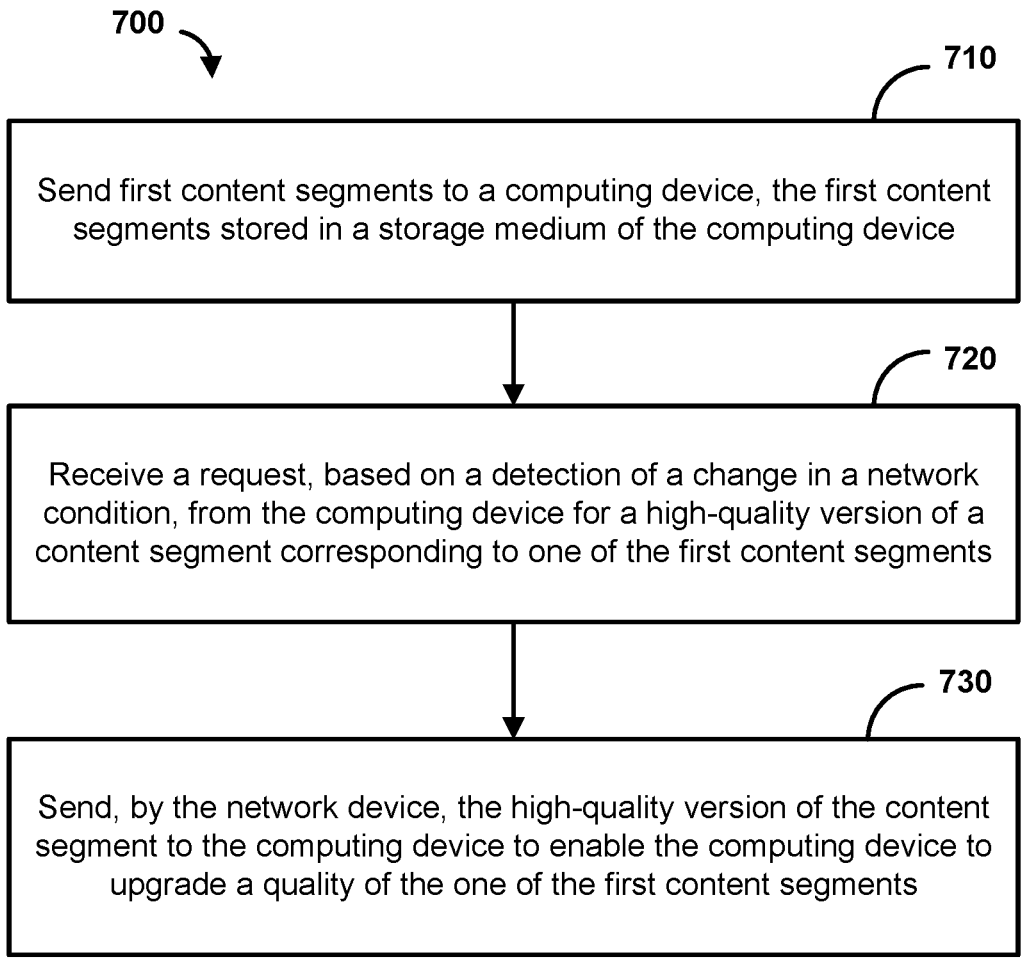
FIG. 7 shows an example method.

FIG. 7 is a flow diagram showing an example method 700 for managing the quality of a content segment. At step 710, a plurality of first content segments (e.g., first content segments 3) may be sent to a computing device (e.g., user device 116, communication device 120) that is configured to output (e.g., render, display, playback, etc.) content segments. The first content segments may be stored in a storage medium (e.g., storage medium 122, storage medium 125) of the computing device. In step 720, a request may be received from the computing device for a higher-quality version of a content segment corresponding to one of the first content segments (e.g., one of the low-quality content segments 3), based on a detection of at least one improved network condition. A presentation time associated with the one of the first content segments may be ahead of a current output position associated with output of content segments by the computing device.

In step 730, the high-quality version of the content segment may be sent to the computing device, to enable the computing device to improve a quality of the one of the first content segments in the storage medium of the computing device, prior to its output by the computing device.

For example, a network device (e.g., network device 110) may provide content segments (e.g., live content, video on demand content, recorded content) to a computing device for a user to watch the content. The network device may receive a request from the computing device (e.g., user device 120, communication device 116) for a high-quality content segment corresponding to a low-quality content segment stored in a buffer of the computing device and yet to be output by the computing device. Based on receiving the request, the network device may select/implement a higher bit rate, relative to a lower bit rate of the low-quality segment, for the high-quality content segment.

The network device may provide the high-quality content segment having the higher bit rate to the computing device. Upon receipt, the computing device may upgrade the low-quality content segment to the high-quality content segment prior to rendering the low-quality content segment. The computing device may upgrade the low-quality content segment by replacing/swapping the low-quality content segment with the high-quality content segment in a memory of the computing device. The computing device may also upgrade the low-quality content segment by adding a difference in bits between the low-quality content segment and the high-quality content segment to the low-quality content segment in the memory.

Figure 8:
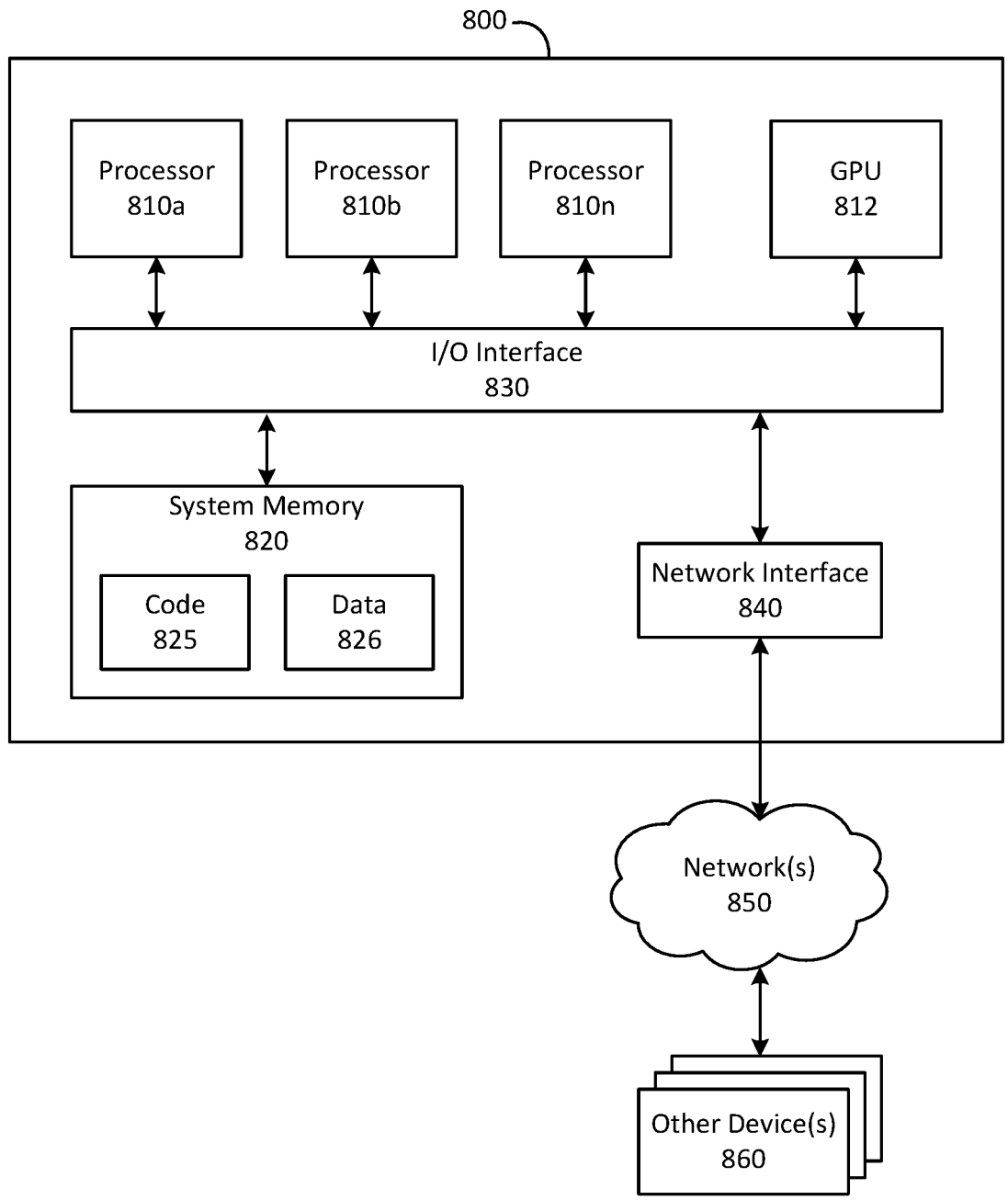
FIG. 8 shows an example computing system.

FIG. 8 shows an example computer architecture for a computing device 800 configured to execute software for performing operations as described above in connection with FIGS. 1-7. It will be appreciated that the described processes may be performed by any suitable system components including by discrete computing systems that communicate over a communications link. The computer architecture shown in FIG. 8 shows an exemplary server, computer, a workstation, a desktop computer, laptop, tablet, network appliance, a PDA, an e-reader, a digital cellular phone or other computing node, and may be utilized to execute any aspects of the software components presented herein.

The computing device 800 includes one or more processors 810a, 810b, and/or 810n (which may be referred herein singularly as a processor 810 or in the plural as the processors 810) coupled to a system memory 820 via an input/output (I/O) interface 830. The computing device 800 further includes a network interface 840 coupled to the I/O interface 830. One or more of the communication devices 116 and the user device 120 may be embodied as the computing device 800.

The computing device 800 may be a uniprocessor system including one of the processors 810 or a multiprocessor system including several of the processors 810 (e.g., two, four, eight, or another suitable number). The processors 810 may be any suitable processors capable of executing instructions. In various aspects, the processor(s) 810 may be general-purpose or embedded processors implementing any of a variety of instruction set architectures (ISAs), such as the x86, PowerPC, SPARC, or MIPS ISAs, or any other suitable ISA. Each of the processors 710 may commonly, but not necessarily, implement the same ISA in multiprocessor systems.

A graphics processing unit ("GPU") 812 may participate in providing graphics rendering and/or physics processing capabilities. A GPU may, for example, comprise a highly parallelized processor architecture specialized for graphical computations. The processors 810 and the GPU 812 may be implemented as one or more of the same type of device.

The system memory 820 may be configured to store instructions and data accessible by the processor(s) 810. The system memory 820 may be implemented using any suitable memory technology, such as static random access memory ("SRAM"), synchronous dynamic RAM ("SDRAM"), non-volatile/Flash®-type memory, or any other type of memory. Program instructions and data implementing one or more desired functions, such as those methods, techniques and data described above, are shown stored within the system memory 820 as code 825 and data 826.

The I/O interface 830 may be configured to coordinate I/O traffic between the processor(s) 810, the system memory 820 and any peripherals in the device, including the network interface 840 or other peripheral interfaces. The I/O interface 730 may perform any necessary protocol, timing or other data transformations to convert data signals from one component (e.g., the system memory 820) into a format suitable for use by another component (e.g., one or more of the processors 810). The I/O interface 730 may include support for devices attached through various types of peripheral buses, such as a variant of the Peripheral Component Interconnect (PCI) bus standard or the Universal Serial Bus (USB) standard, for example. The function of the I/O interface 830 may be split into two or more separate components, such as a north bridge and a south bridge. Also, in some aspects some or all of the functionality of the I/O interface 830, such as an interface to the system memory 820, may be incorporated directly into the processor 810.

The network interface 840 may be configured to allow data to be exchanged between the computing device 800 and other devices 860 attached to a network or networks 850, such as other computer systems or devices. The network interface 740 may support communication via any suitable wired or wireless general data networks, such as types of Ethernet networks. The network interface 840 may support communication via telecommunications/telephony networks, such as analog voice networks or digital fiber communications networks, via storage area networks, such as Fibre Channel SANs (storage area networks), or via any other suitable type of network and/or protocol.

The system memory 820 may be one aspect of a computer-accessible medium configured to store program instructions and data as described above for implementing aspects of the corresponding methods and apparatus. Program instructions and/or data may be received, sent, or stored upon different types of computer-accessible media. A computer-accessible medium may include non-transitory storage media or memory media, such as magnetic or optical media, e.g., disk or DVD/CD coupled to the computing device 800 via the I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 800 as the system memory 820 or another type of memory. A computer-accessible medium may include transmission media or signals, such as electrical, electromagnetic or digital signals, conveyed via a communication medium, such as a network and/or a wireless link, such as those that may be implemented via the network interface 840. Portions or all of multiple computing devices, such as those shown in FIG. 8, may be used to implement the described functionality in various aspects; for example, software components running on a variety of different devices and servers may collaborate to provide the functionality. Portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some aspects be offered to clients in various units related to the web service, such as an amount of storage capacity for storage, processing capability for processing, as instances, as sets of related services, and the like. A virtual computing instance may comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different aspects, including general-purpose or special-purpose computer servers, storage devices, network devices, and the like. A client or user may be provided direct access to a resource instance, e.g., by giving a user an administrator login and password. The provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. The computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware. Instances may be copied within an availability zone or across availability zones to improve the redundancy of the instance, and instances may be migrated within a particular availability zone or across availability zones. The latency for client communications with a particular server in an availability zone may be less than the latency for client communications with a different server. An instance may be migrated from the higher latency server to the lower latency server to improve the overall client experience.

It should be appreciated that the network topologies shown in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. It should also be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the modules may in some aspects be combined in fewer modules or distributed in additional modules. The functionality of some of the modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. Elements may be added to, removed from, or rearranged compared to the disclosed example aspects.

It will also be appreciated that various items are shown as being stored in memory or on storage while being used, and that these items or portions of thereof may be transferred between memory and other storage devices for purposes of memory management and data integrity. Some or all of the software modules and/or systems may execute in memory on another device and communicate with the computing systems via inter-computer communication. Some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FP- GAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. The present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect or embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Nothing in the foregoing description is intended to imply that any particular feature, characteristic, step, module, or block is necessary or indispensable. The novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
   receiving a first version of a content segment, wherein the first version of the content segment comprises content encoded at a first bit rate;
   based on a change in a network condition, sending a request for a quantity of data associated with the content segment;
   determining a second version of the content segment, wherein the second version of the content segment comprises an addition of the quantity of data to the first version of the content segment, and wherein the content of the second version of the content segment is encoded at a second bit rate higher than the first bit rate; and
   causing output, at an output time associated with the content segment, of the second version of the content segment.

2. The method of claim 1, wherein the sending is further based on determining that a difference between a current output time and the output time associated with the content segment satisfies a threshold.

3. The method of claim 2, wherein the current output time is ahead of the output time associated with the content segment.

4. The method of claim 1, further comprising receiving, based on the request, the quantity of data.

5. The method of claim 1, further comprising:
   storing the first version of the content segment in a memory for output.

6. The method of claim 5, wherein the memory comprises a content buffer.

7. The method of claim 1, wherein the change in the network condition comprises at least one of:
   a change in bandwidth associated with the network;
   a change in throughput associated with the network; or
   a change in data rate associated with the network.

8. The method of claim 1, wherein the second version of the content segment is associated with a higher quality than the first version of the content segment.

9. The method of claim 1, wherein the content comprises at least one of linear content, non-linear content, video content, audio content, multi-media content, recorded content, or stored content.

10. The method of claim 1, wherein the quantity of data comprises a difference between a quantity of data corresponding to the first bit rate associated with the first version of the content segment and a quantity of data associated with the second bit rate.

11. A method comprising:
    storing a first quality version of a content segment for output;
    based on a change in a condition of a network, sending a request for a quantity of data associated with the content segment;
    determining a second quality version of the content segment, wherein the second quality version comprises an addition of the quantity of data to the first quality version of the content segment, and wherein the second quality version is associated with a different quality than the first quality version; and
    causing, at an output time associated with the content segment, output of the second quality version of the content segment.

12. The method of claim 11, wherein the first quality version and the second quality version are associated with at least one of an encoding bit rate or a resolution.

13. The method of claim 11, wherein at least one of an encoding bit rate or a resolution associated with the second quality version is higher than an encoding bit rate or a resolution associated with the first quality version.

14. The method of claim 11, wherein the sending is further based on determining that a difference between a current output time and the output time associated with the content segment satisfies a threshold.

15. The method of claim 11, wherein the storing the first quality version of the content segment for output comprises storing the first quality version of the content segment in a memory, and wherein the addition of the quantity of data to the first quality version of the content segment is performed in the memory.

16. The method of claim 15, wherein the memory comprises a content buffer.

17. The method of claim 11, wherein the change in the condition of the network comprises at least one of:

a change in bandwidth associated with the network;
a change in throughput associated with the network; or
a change in data rate associated with the network.

18. The method of claim 11, wherein the quantity of data comprises a difference between a quantity of data corresponding to a first bit rate associated with the first quality version of the content segment and a quantity of data associated with a second bit rate higher than the first bit rate.

\* \* \* \* \*